Jan. 6, 1953  G. MUNTZ, JR  2,624,830
HIGH-FREQUENCY DIELECTRIC HEATING APPARATUS
Filed March 30, 1948
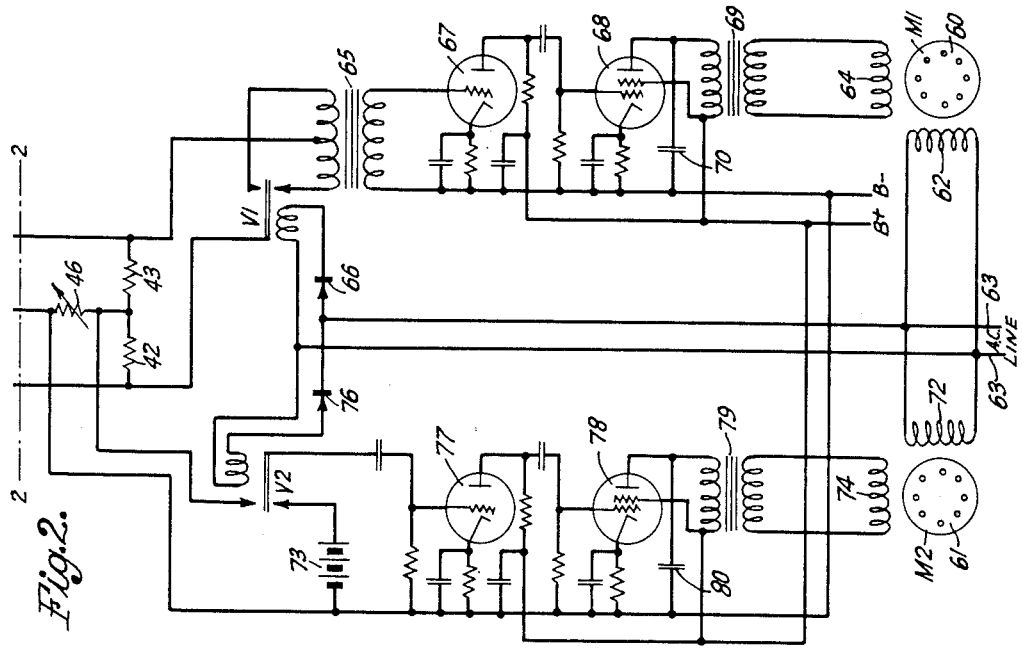
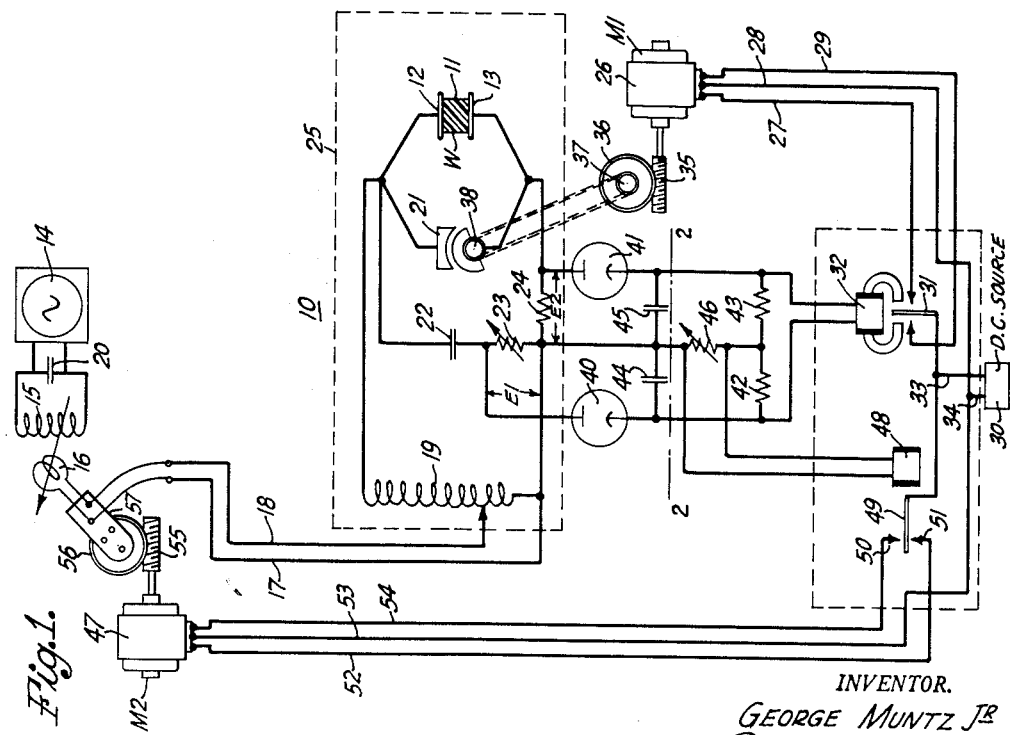
INVENTOR.
GEORGE MUNTZ JR
BY
Raymond N. Matson
AGENT Patented Jan. 6, 1953

2,624,830

UNITED STATES PATENT OFFICE 2,624,830

HIGH-FREQUENCY DIELECTRIC HEATING APPARATUS

George Muntz, Jr., Port Washington, N. Y.

Application March 30, 1948, Serial No. 18,037

3 Claims. (Cl. 219—47)

This invention relates to high frequency dielectric heating apparatus and more specifically to control means for apparatus of this type.

It is an object of this invention to provide an improved high frequency dielectric heating system.

One well-known high frequency dielectric heating apparatus employs a phase sensitive bridge circuit to develop a current for controlling a reversible tuning motor to maintain resonance of the heating circuit with the driving oscillator during the heating of the thermo-plastic or thermo-setting work material. This apparatus regulates power input to the material being heated, but only to the extent of supplying the maximum power available from the generator. In actual practice in industry, it is frequently desirable to further regulate power input by maintaining a desired voltage in the heating circuit. Because automatic tuning devices operate to maintain optimum energy transfer conditions, excessive voltages are frequently developed. Excessive voltage causes arc-overs which damage the material being heated and interrupt production. Voltage fluctuations also cause non-uniform heating results in successive operations.

It is, accordingly, another object of this invention to combine, in a high frequency dielectric heating apparatus, automatic control of the voltage across the work material with tuning of the work circuit to maintain efficient energy transfer conditions therein.

It is still another object of this invention to provide novel and improved means for automatically controlling the voltage of the work circuit in a high frequency dielectric heating apparatus.

It is a further object of this invention to simplify and make practical the automatic controlling apparatus for a high frequency dielectric heating system.

These are related objects are attained in accordance with the invention by providing, in an exemplary embodiment thereof, a high frequency dielectric heating apparatus in which a motor is used to control the impedance of a reactive element in circuit with the dielectric work material being heated so as to maintain the heating circuit in a resonant condition at the frequency of the driving oscillator and a second motor is used to control the coupling of the circuit supplying power from the oscillator to the work material, both motors being driven in accordance with voltages produced across impedance elements in circuit with the work material. The motors can be of any suitable type. In one arrangement, to be hereinafter described in detail, direct current motors are used while a modified arrangement employs two-phase alternating current motors. Both types are reversible and relays or vacuum tubes are used to provide control currents of the proper polarity or phase.

While two specific embodiments are described below, it is to be specifically understood that the descriptions are merely by way of example since the invention is not limited to any specific circuit arrangement or means for producing the desired results mentioned above.

The invention will be more readily understood by referring to the following description taken in connection with the accompanying drawings forming a part thereof, in which:

Fig. 1 is a schematic circuit diagram of a system for high frequency heating embodying in accordance with the invention a control arrangement for maintaining the voltage across the work electrodes within desired limits and for regulating the power transfer between the generator and the heating circuit;

Fig. 2 is a circuit diagram of an electronic motor-control circuit which can be used in place of a portion of the system of Fig. 1.

Referring more specifically to the drawing, Fig. 1 shows, by way of example for purposes of illustration, a circuit 10, in accordance with the invention, suitable for heating by high frequency means an object 11 which can be a dielectric plastic member, for example. The object 11 is placed between upper and lower plates 12 and 13, respectively, which together with the dielectric material 11 form a work condenser W. A high frequency voltage from the source 14, which produces waves of a frequency of 20 megacycles, for example, is applied across the plates 12 and 13 by means of the circuit which includes coils 15 and 16 which are coupled together, lines 17 and 18, and coil 19. A condenser 20 is connected across coil 15 for tuning purposes. A variable condenser 21 is shunted across the work condenser W and these two condensers in parallel are connected in series with a resistor 24 in a branch circuit connected in parallel with the coil 19. A series circuit including condenser 22 and resistor 23 (which may be varied) is also shunted across the coil 19.

For best heating results, it is desired that the circuit including the work condenser W and the condensers 21 and 22 in circuits parallel thereto and to the coil 19 be tuned to resonance at that frequency at which the voltage appearing across the work condenser W is the highest possible for the amount of power being introduced to the circuit. The capacity of the condenser 21 is varied until the resonant frequency of the circuit elements within the dotted line rectangle 25 in Fig. 1 has the desired value. This initial setting, however, is not sufficient to maintain this desired relationship since the dielectric constant of the object 11 being heated tends to vary as it is heated, thus changing the capacity of the work condenser W and hence the resonant frequency of the circuit within the rectangle 25.

In order to maintain this desired relationship, the motor 26 is provided. This motor can be of any suitable type and has been shown by way of example in Fig. 1 as a reversible D. C. motor having three input connections 27, 28 and 29 for receiving power from a D. C. source 30 through armature 31 of relay 32 operated by circuit control means to be hereinafter described. When the armature 31 is in its right-hand position, a circuit is completed from terminal 33 of source 30, through armature 31, right-hand contact of relay 32, lead 27, one-half of the field winding (not shown) of motor 26, and lead 28 to the other terminal 34 of the D. C. source 30. This drives the motor 26 in one direction and, through worm 35 and gear 36, for example, rotates a pulley 37 which is connected to drive another pulley 38 on the shaft of variable condenser 21, thus adjusting the tuning of the circuit within the rectangle 25. When the armature 31 is in its left-hand position, a different circuit is completed, this circuit starting with source 30 and continuing through lead 33, armature 31, left-hand contact of relay 32, lead 29, the other half of the field winding (not shown) of motor 26, lead 28, and terminal 34 back to the source 30. This circuit drives the motor 26 in the opposite direction and accordingly varies the capacity of variable condenser 21 in the opposite direction.

The control circuit for operating relay 32 will now be described. The operation of this relay is controlled by the relation of the potentials E1 and E2 appearing across the resistors 23 and 24, respectively. Diode rectifiers 40 and 41 and the resistors 42 and 43 are connected to form circuits parallel to the resistors 23 and 24, respectively, as shown in Fig. 1. In this manner, direct currents proportional to the high frequency currents in resistors 23 and 24 are circulated in resistors 42 and 43. The magnitude and direction of these direct currents are determined by the relation of the high frequency potentials across resistors 23 and 24. When the heating circuit within the rectangle 25 is tuned to resonance at the frequency of the generator 14, the resistors 23 and 24 are adjusted so that equal potentials appear across resistors 42 and 43. Condensers 44 and 45 act to bypass stray high frequency currents out of the D. C. portion of the circuit.

If the heating circuit within the rectangle 25 becomes detuned by a change in the capacity of the work condenser W, the relation of the currents in resistors 23 and 24 is disturbed and a direct current differential appears across the resistors 42 and 43. The differential current is zero when the circuit is tuned to resonance, of one polarity when the capacity is lower than that corresponding to that setting and of opposite polarity when the capacity is higher than that corresponding to that setting. This differential current is applied to the coil of the relay 32 to actuate the armature to its right or left hand position, depending on the polarity, and this in turn turns the rotor of the variable condenser 21 in the proper direction until the heating circuit is retuned, at which condition the differential current across the resistors 42 and 43 becomes zero again and the motor 26 stops.

The resistor 46, connected between the common terminal of the resistors 42 and 43 and the common terminal of the resistors 23 and 24, has produced thereacross a direct voltage having a magnitude proportional to the high frequency voltage of the heating circuit 25. By means of an appropriate motor 47 and control circuit, such as that containing the relay 48, the direct voltage across resistor 46 is used to run the motor 47 in one direction when this voltage is lower than a desired value, in the opposite direction when the voltage is higher than this value, and to stop this motor when the voltage across the resistor 46 (which is proportional to the voltage across the work substance 11) has the desired value. The relay 48 can be of any suitable type which operates to move an armature, such as the armature 49, to one of the other of two contacts 50 and 51 depending on the strength of the voltage in its coil. The motor 47 has three terminals or leads 52, 53 and 54 which are connected to the source 30 in a similar manner to the corresponding terminals of motor 26 so these connections will not be described in detail. The motor 47 operates to move coil 16 with respect to coil 15 through the drive produced by worm 55 and gear 56 on which is supported a holder 57 for the coil 16.

It will thus be apparent that Fig. 1 shows a system in which the variation of the capacity of the work condenser W, as the temperature of the work 11 varies, controls the operation of motor 26 to vary the impedance of the heating circuit to compensate for this change, and thus maintain the tuning of the heating circuit, and in which also the variation in voltage across the work substance sets into motion the motor 47 for varying the coupling of the circuit feeding power to the heating circuit from the source 14, thus keeping the voltage across the heating circuit within desired limits.

It is obvious that many changes can be made in the control circuits of this invention without departing from the spirit thereof. One modified arrangement is shown in Fig. 2 which is a replacement for that portion of the circuit of Fig. 1 below line 2—2 and for the motors 26 and 47, the circuit arrangements being otherwise the same. In the arrangement of Fig. 2, two-phase alternating current motors 60 and 61 replace the direct current motors 26 and 47, respectively, and electronic control circuits, instead of relay circuits, are utilized.

In Fig. 2, the current for one phase winding 62 of the motor 60 can be supplied by the usual 60 cycle power lines 63 and current for the other phase winding 64 is supplied by a converter, amplifier and tuning circuit comprising (1) a vibrator V1 which acts in cooperation with transformer 65 and rectifier 66 connected in circuit with power lines 63 to produce, in well known manner, from the D. C. differential control signal across resistors 42 and 43, a 60 cycles per second alternating square wave output, (2) vacuum tube amplifier stages 67 and 68 of any suitable form to amplify these square waves, and (3) a 60 cycle tuning circuit comprising transformer 69 and condenser 70 to produce a 60 cycle sine wave from the square wave. The operation of the motor 60 controls the adjustment of the condenser 21 in the same manner as does motor 26 in Fig. 1. The frequency of the amplifier output current is synchronized with the line current while the magnitude and phase angle are determined by the magnitude and polarity of the direct current input signal across resistors 42 and 43. The vibrator V1 and amplifier stages 67 and 68 and the tuning circuit 69, 70 are adjusted so that a direct current input of one polarity produces a 60 cycle per second supply that is 90 degrees out of phase with the line current. A polarity reversal of the direct current input signal produces a 180 degree shift in phase angle of the wave applied to winding 64. As one phase of the motor is supplied by the fixed line current and the other phase by the output of this electronic amplifier circuit, the direction of rotation is thereby controlled by the polarity of the direct current signal input to the amplifier. As the motor 60 is of the type which cannot run on one phase alone, it is stationary when the direct current input signal is zero.

The left hand side of Fig. 2 is very similar to the right hand side, the left circuit being driven by the voltage across resistor 46 to operate two phase motor 61 (in place of motor 47) to rotate coil 16. Thus, V2 corresponds to V1, rectifiers 76 and 66 are similar, amplifiers 77 and 78 correspond, respectively, to amplifiers 67 and 68, tuning members 79 and 80 are like members 69 and 70, respectively, and windings 72 and 74 of motor 61 are similar to windings 62 and 64 of motor 60. The D. C. source 73 serves as a known standard reference potential source against which the potential across resistor 46 is compared. The relation of these two potentials determines the magnitude and phase angle of the output to the motor 61. When the two potentials are equal, no current flows in the amplifier input circuit. An unequal condition produces a direct current flow of one polarity when the potential across resistor 46 is higher than some desired value and of opposite polarity when it is lower than this desired value. A reversal of polarity produces a 180 degree shift in the phase angle of the amplifier output current which determines the direction of motor rotation.

The electronic amplifier type of motor control system is, in general, preferable to the type shown in Fig. 1 since there is a continual control. The relay contact arrangement of Fig. 1 has an on-and-off method of operation while the arrangement of Fig. 2 has a gradual controlling action which is thus more satisfactory.

Obviously, many other changes can be made in the embodiments described above without departing from the spirit of the invention the scope of which is indicated in the claims.

What is claimed is:

1. In high frequency dielectric heating apparatus of the type adapted to support between a pair of electrodes a dielectric substance to be heated which has the property of varying its dielectric constant as its temperature changes, a source of high frequency electrical waves for heating said substance, a resonant circuit including a variable condenser and the work condenser formed by said dielectric member and said pair of electrodes, a coupling circuit including a fixed coil and movable coil for applying waves from said source to said resonant circuit, means responsive to the change in impedance in said work condenser and including a first motor connected to vary the capacitance of said variable condenser for maintaining the resonant frequency of said resonant circuit substantially constant, and means responsive to current flowing in said resonant circuit and including a second motor connected to vary the position of said movable coil with respect to said fixed coil for maintaining the voltage applied to said resonant circuit within predetermined limits.

2. The combination of elements as in claim 1 in which the means for maintaining the resonant frequency substantially constant includes a pair of resistors in the resonant circuit which are connected to produce a differential current to control the operation of said first motor in a direction to reduce the differential current to zero.

3. The combination of elements as in claim 1 in which the means for maintaining the voltage within predetermined limits includes a resistor connected to control a two-contact relay to operate said second motor in one direction or the other depending on whether or not the voltage across said resistor exceeds a predetermined value.

GEORGE MUNTZ, Jr.

REFERENCES CITED

The following references are of record in the file of this patent:

UNITED STATES PATENTS

| Number | Name | Date |
|---|---|---|
| 595,086 | Weymann | Dec. 7, 1897 |
| 2,147,689 | Chaffee | Feb. 21, 1939 |
| 2,300,742 | Harrison et al. | Nov. 3, 1942 |
| 2,346,794 | Seeger et al. | Apr. 18, 1944 |
| 2,358,454 | Goldstine | Sept. 19, 1944 |
| 2,376,527 | Wills | May 22, 1945 |
| 2,376,667 | Cunningham et al. | May 22, 1945 |
| 2,396,004 | Gilbert | Mar. 5, 1946 |
| 2,415,799 | Reifel et al. | Feb. 11, 1947 |
| 2,416,172 | Gregory et al. | Feb. 18, 1947 |
| 2,466,931 | Crandell | Apr. 12, 1949 |
| 2,467,285 | Young et al. | Apr. 12, 1949 |
| 2,470,443 | Mittelmann | May 17, 1949 |
| 2,473,188 | Albin | June 14, 1949 |
| 2,508,321 | Wilmotte | May 16, 1950 |
| 2,551,756 | Mittelmann | May 8, 1951 |